United States Patent [19]

Opelt

[11] 3,939,490
[45] Feb. 17, 1976

[54] APPARATUS FOR ASSEMBLING VIDEO SEQUENCES ON TAPE IN PHASE SYNCHRONIZATION

[75] Inventor: Christian Opelt, Bernbach, Germany

[73] Assignee: Grundig E.M.V. Elektro-Mechanische Versuchsanstalt Inh. Max Grundig, Furth, Bavaria, Germany

[22] Filed: Feb. 5, 1975

[21] Appl. No.: 547,265

[30] Foreign Application Priority Data
May 15, 1974 Germany............................ 2423489

[52] U.S. Cl. ....................... 360/14; 360/70; 360/73
[51] Int. Cl.² ........................................ H04N 5/795
[58] Field of Search ............ 360/13, 14, 70, 73, 84; 178/6.6 P

[56] References Cited
UNITED STATES PATENTS

| | | | |
|---|---|---|---|
| 3,176,067 | 3/1965 | Machein et al. ....................... | 360/14 |
| 3,600,508 | 8/1971 | Dann et al. ............................ | 360/14 |
| 3,654,398 | 4/1972 | Louth ................................... | 360/14 |
| 3,666,883 | 5/1972 | Yanno et al. .......................... | 360/73 |
| 3,686,432 | 8/1972 | Deguchi et al. ....................... | 360/70 |
| 3,742,132 | 6/1973 | Sanguu et al. ..................... | 178/6.6 P |
| 3,772,468 | 11/1973 | Tatsuguchi ....................... | 178/6.6 P |

*Primary Examiner*—Raymond F. Cardillo, Jr.

[57] ABSTRACT

An apparatus is provided for recording on videotape to insure the absence of phase error between different sequences in the assembling mode. The apparatus includes a reference pulse source and circuitry to apply reference pulses from the source to a first recording of the tape through a fixed transducer head for recording and playback. The reference pulses also control the speed of the motor driving the tape through a servo mechanism. A tachometer-generator is operatively connected to the motor to produce a train of pulses related to the motor speed at a frequency comprising a fixed integer multiple of the frequency of the reference pulses. The output of the tachometer is fed to a counter which divides the tachometer pulses by the fixed integer so that the output of the counter represents a train of pulses, the frequency of which is equal to that of the reference pulses. The present apparatus further includes a first circuit interconnecting the transducer head and the counter when the recorded reference pulses of the first recording are played back so as to bring the output of the counter into phase synchronization with the recorded reference pulses. The apparatus also includes a second circuit interconnecting the output of the counter and the transducer head and disconnecting the reference pulse source from the transducer head when assembling of an additional sequence so as to produce reference pulses for the additional sequence from the counter and hence in phase synchronization with the reference pulses on the first sequence.

2 Claims, 2 Drawing Figures

APPARATUS FOR ASSEMBLING VIDEO SEQUENCES ON TAPE IN PHASE SYNCHRONIZATION

BACKGROUND OF THE INVENTION

The present invention relates to videotape recording and more particularly to an apparatus to insure the proper phase synchronization between adjacent sequences.

Magnetic videotape recordings are frequently produced by the so-called diagonal track process. In accordance with this process, the magnetic tape is helically wound about a cylindrical drum while a video head or series of heads rotate in a gap perpendicular to the drum axis. As a result, diagonal tracks are recorded on the tape which are parallel to one another and extend diagonally across the tape. Each diagonal track may contain a video frame or field. The video heads rotate at a constant velocity and hence the angle of the diagonal track depends on the tape speed. Thus, to insure proper reproduction, it is essential that the tape speed be precisely maintained during both recording and playback.

To insure the proper maintenance of the tape speed, it has heretofore been proposed to provide a synchronizing track directly on the tape. The synchronizing track is generally recorded at an edge of the tape and is produced by a special fixed head independent of the image head during the recording process. During playback, the synchronizing track is sensed by the fixed head and a synchronizing signal is fed to a servo mechanism for controlling the speed of the tape transport to insure playback at the proper speed.

This prior art arrangement is shown in FIG. 1. In this figure, the magnetic tape 1 is transoorted by shaft 2 which in turn is driven by motor 3. A reference pulse source (not shown) is connected to terminal 4 which in turn is connected to a special transducer head 6 fixed with respect to the tape for recording the reference pulses onto tape 1 when switch 5 is in the "record" position. The frequency of the reference pulses is generally equal to the field frequency so that a one to one relationship exists between reference pulses and vertical synchronizing signals on the tape. The video recording head, which plays no part in the present invention is not shown in the drawings.

The reference pulses at terminal 4 are also connected to a servo mechanism 7 which controls the speed of motor 3. A tachometer-generator 8 is operatively coupled to the motor or shaft so as to respond to the speed of the tape transport by producing a train of pulses indicative of the speed of the motor. The tachometer pulses are fed through switch 9 to the servo mechanism 7 where the tachometer pulses are compared with the reference pulses and the motor is adjusted as required to minimize any error between the two.

When switches 5 and 9 are switched to their "playback" position, the mode of operation of transducer head 6 is changed to enable it to sense the pre-recorded pulses on a tape being played back. These pulses are amplified through amplifier 10 and fed to the servo control 7 through switch 9 where they are compared with the reference pulses so that the speed of the motor may be adjusted as required to insure playback at the recording speed.

As a result of mechanical tolerances in the tape 1 and head 6 some misalignment of the head and tape may occur between "recording" and "playback." Accordingly, phase shifting means 11 is provided to compensate for any such misalignment. Circuit 11 permits manual (or automatic) slight adjustment or shifting of the phase of the output of the transducer head to obtain the best signal-to-noise ratio of the output signal.

The above described system works adequately where uncorrelated sequences are recorded. However, synchronization problems arise if after a first sequence a second or more sequences have to be assembled and later reproduced without interruption. In this case the first reference pulse recorded with the additional sequence will be at a random location with respect to the last reference pulse on the first sequence. Thus, when the two sequences are played back together, a distortion or disturbance of the recorded image will occur at the splice point. Also, when the assembling point is reached in playback, the phase shifter has to be reset to compensate for track errors of the second sequence.

Heretofore, various schemes have been proposed to avoid this problem. One such prior art scheme is disclosed in German application DT-OS 2,339,406 which utilizes complicated and expensive components requiring counters, memory devices, auxiliary signal sources, comparison circuits and the like. In addition, calibration and monitoring of the different parts of the prior art circuit are critical and require a high degree of precision.

In view of the above, it is a principal object of the present invention to provide a simplified and relatively inexpensive system for recording and playing back video sequences in phase synchronization with one another.

SUMMARY OF THE INVENTION

The above and other beneficial objects and advantages are attained in accordance with the present invention by providing an apparatus which includes a reference pulse source for applying reference pulses to the tape through a fixed transducer head for recording and playback. The reference pulses also control the speed of the motor driving the tape through a servo mechanism. A tachometer-generator is operatively connected to the motor to produce a train of pulses related to the motor speed at a frequency comprising a fixed integer multiple of the frequency of the reference pulses. The output of the tachometer is fed to a counter which divides the tachometer pulses by the fixed integer so that the output of the counter represents a train of pulses the frequency of which is equal to that of the reference pulses. The present apparatus further includes first circuit means interconnecting the transducer head and the counter when the recorded reference pulses are played back so as to bring the output of the counter into phase synchronization with the recorded reference pulses. The apparatus also includes second circuit means interconnecting the output of the counter and the transducer head and disconnecting the reference pulse source from the transducer head when recording an additional sequence in the assembling mode so as to produce reference pulses for the additional sequence from the counter and hence in phase synchronization with the reference pulses of the first sequence.

DETAILED DESCRIPTION OF THE PREFERRED EMBODIMENT

Figure 1:
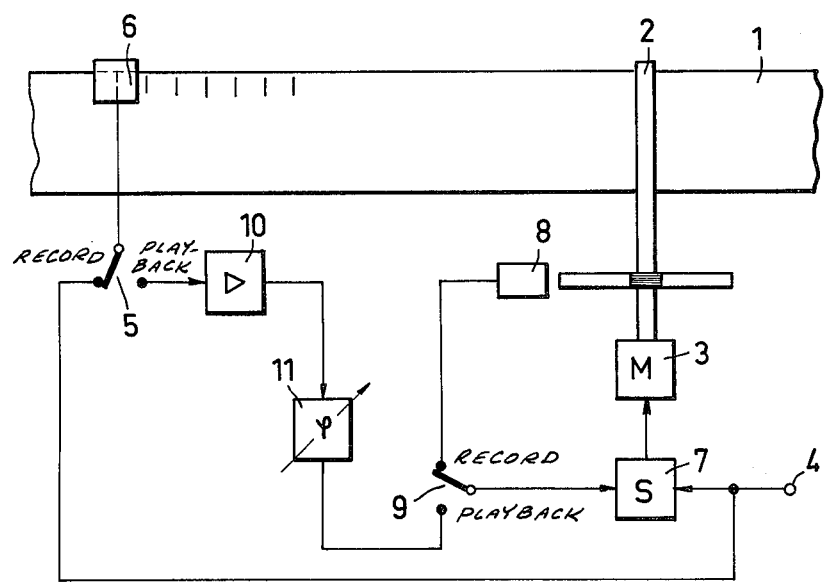
FIG. 1 is a schematic circuit drawing representative of the prior art.
Figure 2:
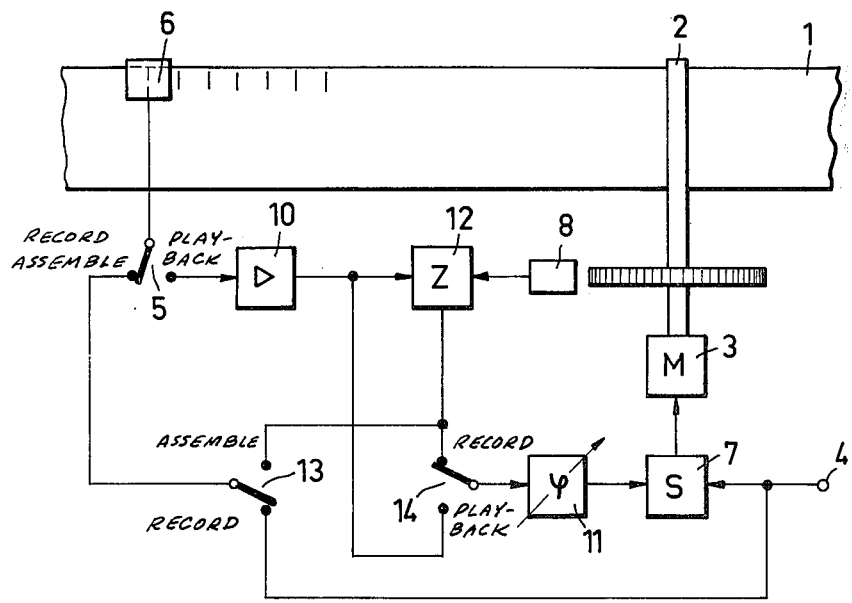
FIG. 2 is a schematic circuit drawing of the present invention.

Reference is now made to FIG. 2 wherein the present invention is depicted. Where components of the present invention as depicted in FIG. 2 correspond with components known in the prior art as exemplified by FIG. 1, the same reference numeral will be used. Accordingly, in FIG. 2 as in FIG. 1 reference pulses from a reference pulse source are brought to a terminal 4 and fed to a servo mechanism 7 for use in controlling the speed of drive motor 3 which in turn drives the transport 2 for tape 1. A tachometer-generator 8 is provided which generates a train of pulses the frequency of which corresponds to the rotational speed of the motor and hence comprises fixed integer multiple of the reference pulse frequency. Thus, if $f$ represents the reference pulse frequency, $n.f$ represents the frequency of the output pulses of tachometer-generator 8. For reasons to be described forthwith, it is desirable that $n$ be as large an integer as possible.

The output of the tachometer-generator is fed to a counter 12 which is permanently set to divide the input pulses fed to it by $n$. Thus, a train of pulses, the frequency of which is $f$ (the same frequency as the reference pulse frequency) is available at the output of counter 12.

The output of counter 12 is connected through a circuit including switches 5 and 13 to transducer head 6. It should be noted that switch 13 has two sets of contacts, one set of contacts connects the output of counter 12 with switch 5 and the other set of contacts connects the reference pulse terminal 4 with switch 5. The output of counter 12 is also connected through switch 14 with phase shifter 11 which in turn forms a second input to servo mechanism 7. Thus, the same motor speed error adjustment through the servo control is provided for in the present apparatus as in the prior art.

Switch 5, when in the playback position, also serves to connect the transducer head 6 with amplifier 10. The output of the amplifier is fed to counter 12 and also fed to one contact of switch 14. Thus, when switch 14 is in the playback position, phase shifter 11 receives recorded reference pulses from tape 1 through switch 14 and amplifier 10. When switch 14 is in the record position, phase shifter 11 received output pulses from the counter.

In operation, when the first sequence is to be recorded, switches 5, 13 and 14 are each set to the record position. As a result, while video signals are being recorded on the tape, reference pulses are recorded as a synchronizing track on the edge of tape 1 through head 6. In this initial record mode, the rotational speed of motor 3 is controlled by comparing the output of counter 12 and the reference pulses in the servo mechanism which controls the speed of the motor to reduce any difference between the two during this mode of operation. Phase shifter 11 and phase of the output of counter 12 are without any importance.

When it is desired to assemble a second sequence to the first, switches 5 and 14 are switched over to the playback position. The position of switch 13 is irrelevant. During playback, reference pulses sensed by head 6 are fed through amplifier 10, switch 14, and phase shifter 11 to servo control 7. As with the prior art device, phase shifter 11 is manually or automatically set to obtain the optimum output signal (i.e. the best image). The reference pulses sensed by head 6 are also fed through amplifier 10 to counter 12. Counter 12 is thereby brought into synchronization (within small tolerances) with the reference pulses pre-recorded on the reference track of the first sequence. The frequency of the pulses available at the output of counter 12 will correlate exactly with the frequency of the reference pulses. The phase of these pulses available at the output of counter 12 may deviate from the phase of the pre-recorded reference pulses by $l/n$. Thus, by making n large enough, this deviation becomes insignificant.

If an additional sequence is now assembled to the first sequence for additional video recording, switches 5, 13 and 14 are switched to the "assemble" position. In this regard it should be noted that for switches 5 and 14 the assemble and "record" positions are the same. However, the position of switch 13 changes so as to disconnect the reference pulse source from the recording head and interconnect the output of counter 12 with the recording head. Thus, the reference pulses for the new sequence becomes the output pulses from counter 12. The frequency of these pulses is precisely the same as the frequency of the reference pulses of the first sequence and the phase deviation, if any, is tolerable. The servo control 7 operates in the assemble mode as before and when the combined tape is played back, no adjustment of the phase shifter 11 is required at the splice. Therefore it is very advantageous to lock the phase shifter 11 during the record and assemble mode.

Thus, in accordance with the above, the aforementioned objects are effectively attained.

Having thus described the invention, what is claimed is:

1. Apparatus for recording and reproducing video signals on and from a magnetic tape respectively comprising one or more video heads rotating in a cylindrical drum surrounded helically by said video tape and comprising a fixed magnetic head to record or reproduce synchronizing signals on or from a longitudinal track of said magnetic tape; comprising further a tape transport mechanism to drive said tape at a constant speed, a motor of said tape transport mechanism, a servo mechanism to feed said motor, a tacho-generator coupled to said motor, a counter connected to the output of said tacho-generator, first and second inputs of said servo mechanism, adjustable phase shifting means with an output connected to said first input of said servo mechanism, a source of reference pulses connected to said second input of said servo mechanism to provide means to drive said servo mechanism at nominal tape speed; said tacho-generator producing at nominal tape speed pulses with a repetition rate surpassing the frequency of said reference pulses by a large fixed integer and the frequency of said tacho-generated pulses being divided in said counter by said same fixed integer; said servo mechanism comparing the frequencies of said first and second inputs and generating an error signal to minimize differences between nominal and actual tape speed; and switching means to provide normal record, playback and assemble modes of said apparatus whereby in the normal record mode said reference pulses are additionally fed to said fixed head and recorded thereby on said longitudinal track as synchronizing signals and the output of said counter is fed through said phase shifting means to said first input of said servo mechanism for comparison with said reference pulses in said servo mechanism; in the play back mode said synchronizing signals are reproduced by said fixed head from said longitudinal track and are fed through said phase shifting means to said first input of said servo mechanism and compared with said reference pulses in said servo mechanism, said phase shifting means being adjustable to the phase of said synchronizing pulses to provide the best tracking of said rotating video heads; said synchronizing pulses being additionally fed to said counter to set the phase of the divided tacho-generated pulses in said counter output; and in the assemble mode the preset output pulses of said counter are fed to said phase shifting means to said first input of said servo mechanism for comparison with said reference pulses in said servo mechanism and, at the same time, are fed to said fixed head and recorded there on said longitudinal track.

2. Apparatus for recording and reproducing video signals on and from a magnetic tape respectively comprising one or more video heads rotating in a cylindrical drum surrounded helically by said video tape and comprising a fixed magnetic head to record or reproduce synchronizing signals on or from a longitudinal track of said magnetic tape; comprising further a tape transport mechanism to drive said tape at a constant speed, a motor of said tape transport mechanism, a servo mechanism to feed said motor, a tacho-generator coupled to said motor, a counter connected to the output of said tacho-generator, first and second inputs of said servo mechanism, phase shifting means with an output connected to said first input of said servo mechanism, a source of reference pulses connected to said second input of said servo mechanism to provide means to drive said servo mechanism at nominal tape speed; said tacho-generator producing at nominal tape speed pulses with a repetition rate surpassing the frequency of said reference pulses by a large fixed integer and the frequency of said tacho-generated pulses being divided in said counter by said same fixed integer; said servo mechanism comparing the frequencies of said first and second inputs and generating an error signal to minimize differences between nominal and actual tape speed; and switching means to provide normal record, playback and assemble modes of said apparatus whereby in the normal record mode said reference pulses are additionally fed to said fixed head and recorded thereby on said longitudinal track as synchronizing signals and the output of said counter is fed through said phase shifting means to said first input of said servo mechanism for comparison with said reference pulses in said servo mechanism; in the play back mode said synchronizing signals are reproduced by said fixed head from said longitudinal track and are fed through said phase shifting means to said first input of said servo mechanism and compared with said reference pulses in said servo mechanism, means for adjusting said phase shifting means to the phase of said synchronizing pulses to provide the best tracking of said rotating video heads when in the play back mode; said synchronizing pulses being additionally fed to said counter to set the phase of the divided tacho-generated pulses in said counter output; and in the assemble mode the preset output pulses of said counter are fed to said phase shifting means to said first input of said servo mechanism for comparison with said reference pulses in said servo mechanism and, at the same time, are fed to said fixed head and recorded there on said longitudinal track.

* * * * *